Dec. 17, 1935.   C. P. RANDOLPH ET AL   2,024,876
TEMPERATURE CONTROL DEVICE
Filed Dec. 19, 1931
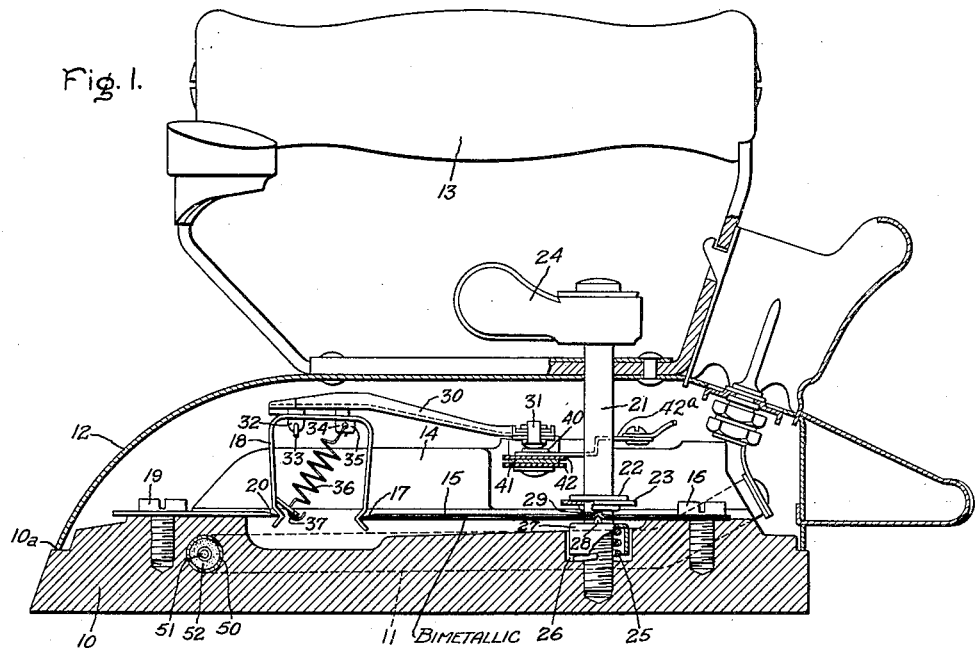
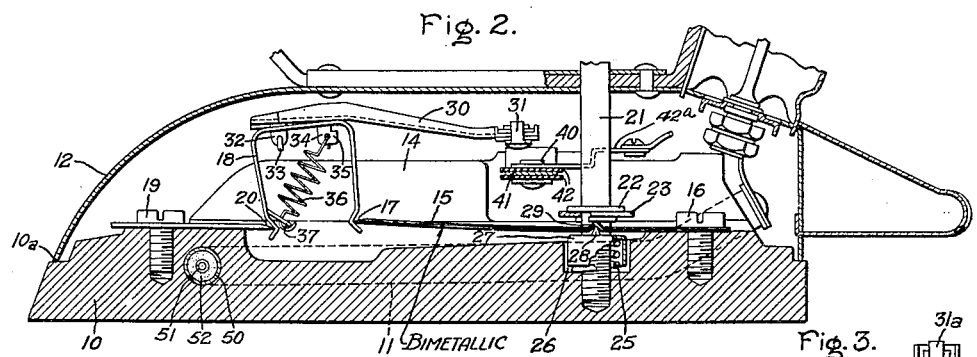
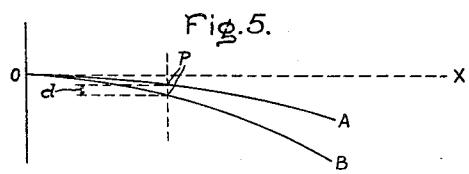
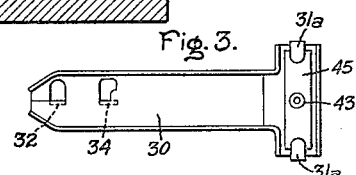
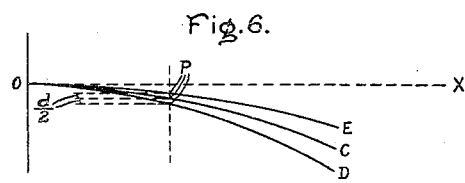
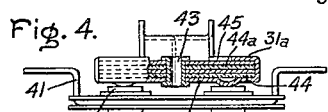
Inventors:
Charles P. Randolph,
Samuel Eskin,
by Charles W. Tullar
Their Attorney.

Patented Dec. 17, 1935

2,024,876

UNITED STATES PATENT OFFICE 2,024,876

TEMPERATURE CONTROL DEVICE

Charles P. Randolph, Oak Park, and Samuel Eskin, Chicago, Ill., assignors to Edison General Electric Appliance Company, Chicago, Ill., a corporation of New York Application December 19, 1931, Serial No. 582,138

5 Claims. (Cl. 200—139)

Our invention relates to temperature control devices, more particularly to devices for controlling an electric circuit in accordance with temperature changes, and has for its object the provision of an improved device of this character.

In general our invention relates to temperature control devices such as described and claimed in U. S. Reissue Patent to A. Lewerenz No. 16,654, dated June 14, 1927, and more specifically relates to improvements in the temperature control device described and claimed in U. S. Patent to A. H. Simmons No. 1,743,073, dated January 7, 1930. The temperature control devices disclosed in these patents comprise a bimetallic thermostat bar fixed at one end and having its other end movable in response to changes in temperature. These movements of the bimetallic bar are utilized to actuate a suitable control member, such as a switch operating arm.

The above temperature control devices further comprise adjusting means whereby the temperature setting of the bimetallic bar and hence of the control device can be changed as desired so that the control device will maintain a predetermined temperature. This adjusting means usually includes an adjusting screw cooperating with the bimetallic bar so as to change its position and hence its temperature setting.

The control devices, of course, will maintain only those temperatures which fall within the maximum and minimum temperature range of the bimetallic thermostat bar. This range to a large extent depends upon the elastic strength of the bar, and while the temperature range of the control devices of the above-mentioned patents is sufficiently large to meet the requirements of many applications, it is desirable in some instances that the range be materially increased. This cannot always be done in these arrangements without danger of subjecting the bimetallic bar to dangerously high stresses. This is because the bimetallic bar has an initial curvature such that it will take a position corresponding to the minimum temperature of the temperature range of the control device. In other words, the initial curvature of the bar is such that with this curvature it will maintain the minimum temperature that the device will maintain. Consequently, the maximum temperature which the device will maintain is determined by the extent that the bar can be adjusted from its initial position without introducing dangerously high stresses in the bar.

It is one of the objects of our invention to provide a temperature control device of the above character wherein the temperature range of the device is materially increased.

In carrying out our invention, we provide a bimetallic thermostat bar having an initial curvature corresponding to some temperature intermediate a predetermined maximum and minimum temperature range, which is the range that it is desired the control device will operate through. Thus, for example, the bar may have such an initial curvature that it will maintain a temperature midway between high and low limits of this temperature range. Suitable control means are provided for changing the position of the bar in one direction from its initial position to increase the temperature setting of the bar and in the opposite direction to decrease the temperature setting of the bar. In this manner the maximum movement of the bar from its initial position is materially reduced with the result that the stresses set up in the bar likewise are decreased. In other words, for a given bimetallic bar the temperature range of the bar can be materially increased without increasing the stresses set up in the bar, or for a given bar and for a given temperature range the mechanical stresses set up in the bar are materially reduced.

For a more complete understanding of our invention reference should be had to the accompanying drawing in which: Fig. 1 is a vertical sectional view of an electric flatiron provided with a temperature control device embodying our invention and illustrating the control device in position to maintain the heating circuit of the iron closed; Fig. 2 is a fragmentary view similar to Fig. 1, but illustrating the control device in position to open the heating circuit of the iron; Fig. 3 is a plan view of a control arm used in the temperature control device of Figs. 1 and 2; Fig. 4 is an elevation illustrating certain switch contacts used in the control device of Figs. 1 and 2, parts being shown in section so as to illustrate certain structural details; Fig. 5 is a diagrammatic view illustrating the principles of operation of certain control devices heretofore generally used; and Fig. 6 is a diagrammatic view illustrating the principle of operation of the control device shown in Figs. 1 and 2.

Referring to the drawing, we have shown our invention in one form as applied to an electric flatiron comprising a heavy body member 10 made of a suitable heat conducting material, such as cast iron, within which is cast a suitable electric heating unit 11. As shown, the upper portion of the body member 10 is enclosed by a cover 12 resting on a shoulder 10a provided for it on the body member 10. The cover 12 is secured to the body member 10 by means of screw members (not shown). Suitably attached to the cover 12 is a handle 13 whereby the iron may be operated.

In the upper portion of the body member 10 is an elongated recess 14 in which is secured a temperature control device for the heating unit 11, the temperature control device being arranged in accordance with my invention.

This temperature control device comprises a suitable thermostat, shown as a bimetallic bar 15 made of two strips of metal having different coefficients of expansion, such as invar and nickel-chromium steel, these two strips being securely welded or brazed together lengthwise. The thermostat bar 15 is rigidly secured at one end to the body member 10 by means of a clamping screw 16 passing through a suitable aperture provided for it in the bar and received in engagement in the sole plate 10. The opposite end of the bar is free to move laterally in response to changes in temperature.

It will be observed that the thermostat 15 is secured within the lower portion of the recess 14 adjacent the working surface of the iron so that heat is transmitted directly to the thermostat from the working surface.

The movable end of the thermostat bar 15 is provided with a knife-edge bearing 17 that is received in a bearing seat provided for it in one arm of an inverted U-shaped resilient member or spring 18. The other arm of this spring member 18 is seated on a fixed knife-edge bearing 20. The knife-edge bearing 20, as shown, projects into the recess 14 and is secured to the base 10 of the iron by means of a screw 19. It will be understood that the position of the bearing member 20 relative to the U-shaped spring member 18 can readily be adjusted by means of the screw member 19. As shown, the knife-edge bearing seats provided in the U-shaped spring member may be arranged by striking V-shaped indentations in the end portions of the two arms of the spring member.

As was pointed out above, the thermostat bar of the above mentioned Simmons patent and like arrangements is given an initial free curvature such that it will take a position corresponding to the minimum temperature of the temperature range of the device. In other words, the initial curvature of the bar is such that with this curvature it will maintain the minimum temperature of the temperature range of the device. In our temperature control device, we give the bimetallic bar 15 an initial free curvature such that with this curvature the bar will operate to maintain a temperature which is intermediate the maximum and minimum temperatures which it is intended the control device shall maintain. For example, if it be assumed that the temperature range of the control device is to be 200° F. operating from a minimum temperature of 300° F. to a maximum temperature of 500° F., the bimetallic bar will be given such an initial free curvature that it will operate to maintain a temperature of say 400° F. which, as will be observed, is midway between the maximum and minimum temperatures of the temperature range selected, rather than an initial free curvature corresponding to the minimum temperature of 300° F. of the temperature range, as is the case in the devices heretofore generally used. In order to increase the temperature setting of the device, the curvature of the bar 15 will be increased from its initial position, whereas to decrease the temperature setting of the device the curvature of the bar 15 will be decreased. It will be understood that by "initial free curvature" of the bar is meant that curvature which the bar takes at substantially room temperature and when it is uninfluenced by the action of the spring 18.

A temperature adjustment rod or shaft 21 is arranged to move the thermostat bar 15 from its initial position to increase the temperature setting of the control device. This rod as shown, is passed through a suitable aperture provided for it in the bar and has its lower end threaded in the body member 10. The adjusting rod has a shoulder 22 rigidly secured thereto or formed integrally therewith and bearing on a washer-like member 23 which in turn bears on the upper surface of the thermostat bar. As shown, the point of engagement of the member 23 with the bar 15 is somewhat less than one-half the distance from the point of support to the movable end of the bar. To increase the setting of the bar, as will be pointed out in more detail hereinafter, the rod 21 is turned to move the washer 23 and hence the bar downwardly. The upper end of the rod 21 protrudes from the cover 12 of the iron and is provided with a handle 24 whereby the rod may be turned to raise or lower it as desired.

In order to move the bar 15 in the opposite direction in order to decrease the temperature setting of the device, a spring 25 is provided beneath the bar and arranged to apply an elastic force to it to move it upwardly. This spring 25 is formed as a helical compression spring and as shown is arranged in a recess 26 provided for it in the base 10 around the rod 21. The spring is arranged in the recess to surround the rod 21 and has its lower end bearing on the bottom wall of the recess and its upper end bearing on an inverted cup-shaped spring washer 27. This washer is provided with knife-edge pivots 28 received in bearings 29 provided for them in the bar 15. As will be pointed out in more detail hereinafter, the spring serves to move the bar upwardly when the abutment 22 is withdrawn by the rod 21 to decrease the temperature setting of the device.

The bearing 20 lies in the plane of movement of the thermostat bar 15 and the arrangement of the thermostat bar is such that at a predetermined temperature the knife-edge bearing 17 on the bar will lie on a line passing through the bearing 20 and the effective point of support of the thermostat. This position of the thermostat is known as the neutral position of the bar. All useful distortion of the thermostat bar takes place in that portion between the abutment 22 on the rod 21 and the movable end, and consequently, from the standpoint of distortion, the abutment 22 constitutes the effective point of support of the thermostat. The neutral position is therefore defined by a line passing through the knife-edge bearing 20 and the point of engagement between the thermostat and the abutment 22.

As has been explained in detail in the above-mentioned Simmons patent, the U-shaped spring member 18 serves to apply an elastic force to the movable end of the thermostat so as to move it quickly from one position to another. The arms of the spring member 18 tend to separate by reason of the resiliency of the member, they being normally compressed somewhat between the bearings 17 and 20, whereby the member exerts a force on the movable end of the thermostat, this force tending to hold the movable end on one side or the other of the neutral position. Obviously, in the neutral position the entire force exerted by the spring member 18 is directed lengthwise of the thermostat. When the end of the thermostat moves from the neutral position in either direction, a lateral component of this spring pressure is produced tending to force the thermostat from its neutral position. This lateral component increases as the thermostat moves away from the neutral position.

The switch which is controlled by the thermostat bar 15 to control the heating circuit of the iron is arranged substantially in accordance with that described and claimed in the U. S. Patent to F. H. McCormick, No. 1,977,395, dated October 16, 1934. As shown, the switch comprises a substantially rigid and mechanically strong switch arm 30 which is pivotally secured to the middle portion of the U-shaped spring member 18 whereby limited freedom of movement is allowed between these members. As shown, the switch arm 30 carries a suitable movable contact member 31 at one end and is pivotally secured at its opposite end to the mid portion of the U-shaped spring member. The switch arm 30 at its connected end has depending therefrom a lug or ear 32 which is received in a suitable aperture provided for it in the middle portion of the spring member 18 so that it projects through the spring member to the under side thereof. The portion projecting under the spring member is provided with an aperture through which a suitable retaining pin 33 is passed and secured to prevent vertical displacement of the switch arm.

The switch arm is further provided with a second depending lug 34, this lug being passed through an aperture provided for it in the forward end of the middle portion of the U-shaped spring member and having on its under side a locking abutment 35. The portion of the lug 34 between the under surface of the spring member and the abutment 35 is somewhat longer than the lug 32 whereby some pivotal movement between the switch arm and the spring member is permitted. The contact arm 30 is normally biased toward the spring member by means of a tension spring 36 which has one end secured to the lug 35 and extends diagonally across the spring member to the opposite arm where it is secured by means of a lug 37 secured to or provided on the arm.

The movable contact 31 cooperates with suitable rivet-like fixed contacts 40 which are rigidly secured to a suitable supporting member 41 arranged on the base 10 of the iron. The contacts are electrically insulated from the support by means of mica sheets 42 arranged on opposite sides of the support 41 so as to be sandwiched between the support and the opposite ends of the contacts 40. Suitable terminals 42a are in electrical contact with the contacts 40 and are secured thereby. If desired, the fixed contacts may consist in button-like members (not shown) welded to the terminals 42a, these members in turn being secured as by means of rivets with a support attached to the base of the iron.

It will be understood that the terminals 42a will be connected in the heating circuit of the iron 10 or in other words, in the circuit of the heating element 11 so that when they are bridged by the contact 31 the heating circuit will be completed, whereas when the bridging contact 31 is moved away the heating circuit will be opened.

The bridging contact 31, as shown, is secured to the contact arm 30 by means of an eyelet 43, a suitable sheet 44 of insulating material, such as mica, being interposed between the arm 30 and the bridging contact member. Arranged on the other side of the contact arm is a similar sheet 44a of insulating material and on this is placed a suitable sheet of metallic material 45. The end portions 31a of the bridging contact member, as shown (Figs. 3 and 4), are bent upwardly and about the mica insulating sheet, the contact member 30 and the metallic sheet 45 so as to clamp these members together and to secure the bridging contact member to the switch arm.

The bridging contact member 31 may be formed of any suitable electrically conducting material, and rather than being formed of a single material as shown in the drawing, it may be formed by coating a suitable supporting body with a good electrically conducting material. Thus, for example, the movable contact may comprise a body member of bronze provided with a contacting surface formed of silver.

In the operation of the control device, the bridging contact 31 will be held in engagement with the fixed contacts 40 to maintain the heating circuit closed, as shown in Fig. 1, as long as the temperature of the iron is below a predetermined maximum value. Under this condition, the movable end of the thermostat is situated below the neutral position. As the temperature of the iron increases the distortion of the thermostat tends to move its free end upward. This motion is resisted by the resilient member 18 until the occurrence of a predetermined maximum temperature, whereupon the thermostat has sufficient force to overcome the spring 18 and it starts to move upward. As the thermostat moves upward the opposing force exerted by the spring 18 decreasingly resists its motion, with the result that the thermostat rapidly accelerates and moves at a high speed through the neutral position to the opposite side thereof, where it is urged rapidly upward by the increasing lateral component of force applied by the spring 18. As the thermostat bar 15 is rapidly moving through its neutral position, the spring member 18 engages the contact arm 30 to move it upwardly and thus open the switch with a snap action.

This snap action is further assured by the flexible connection between the switch operating arm 30 and the resilient spring member 18. Thus, it will be observed that the initial slow retarded motion of the bimetallic bar 15 is absorbed by the loose connection between the switch arm 30 and the spring before the arm is engaged by the spring to open the switch contacts. In other words, the loose connection between the switch arm 30 and the spring member 18 is such that the the bimetallic bar will have an opportunity to accelerate to a high speed before the switch arm is engaged to open the contacts.

After the heating circuit of the iron has been opened and the temperature of the plate 10 and consequently of the thermostat begins to decrease, the thermostat tends to move back to its closed circuit position, its movement in this direction being opposed by the force exerted by the spring member 18 until such time as the spring member is overcome at some predetermined minimum temperature when the thermostat will operate to close the switch. The loose connection between the bar 30 and the bimetallic bar allows the bar to move somewhat after the switch has been closed thereby eliminating the possibility of undue stresses being set up in the bar due to excessive distortion at low temperatures.

In the above-described manner the heating circuit is controlled so as to maintain a predetermined temperature which is a mean between the maximum and minimum temperatures for which the device is set to operate.

As has been pointed out, the temperature setting of the control device is adjusted by means of the adjustment rod 21 and the compression spring 25. To increase the temperature setting of the device the rod 21 is moved downwardly to change the curvature of the bimetallic bar 15, whereas to decrease this setting the rod 21 is screwed upwardly so as to allow the bimetallic bar to be urged in the upward direction by the compression spring 25.

The operation of my temperature adjustment means may be more readily understood by reference to Figs. 5 and 6. In these figures, the bimetallic bar 15 has been shown diagrammatically, and the U-shaped spring member 18 has been eliminated in order to facilitate the explanation of the operation of the device. Fig. 5 illustrates the principle of operation of the adjustment of the thermostat of the above-mentioned Simmons and Lewerenz patents, while Fig. 6 illustrates the principle of operation of the adjustment of the device arranged in accordance with my invention.

Referring more specifically to Fig. 5, let it be assumed that it is desired to operate the thermostat through a range of 200° F., the minimum temperature of the range being 300° F. and the maximum temperature being 500° F. In Figs. 5 and 6 it is assumed that the thermostat bar is secured at the point O and that the adjusting screw 21 engages the bar at the point P. In the case of the thermostat shown in Fig. 5 the bar is given an initial free curvature OA from which position it will operate through the neutral position OX at 300° F., the minimum temperature of the above temperature range, and thus operate the switch. In order to adjust the bar from its 300° F. setting to the maximum temperature setting of 500° F. it is necessary to change the position of the thermostat bar from OA to a position OB by means of the adjusting screw which applies its force at the point P. In making this adjustment the bimetallic bar will be deflected through a distance $d$ at the point P. This deflection of the bar may cause considerable mechanical stresses in the bar on its upper side at the point O where it is secured to the base of the iron.

As has been pointed out in a previous portion of this specification, in order to materially reduce these stresses, we give the bimetallic bar an initial free curvature corresponding to some temperature intermediate the maximum and minimum temperature of the selected temperature range which it is intended the control device shall operate through. As pointed out previously, the initial free curvature of the bar 15 is that curvature which the bar has at substantially room temperature and when the bar is uninfluenced by the compression spring 18, as shown in Fig. 6. Assuming, as before, that it is desired to operate the bar through a temperature range of 300° F. as a minimum temperature to 500° F. as a maximum temperature, the bar will be given a setting corresponding to some intermediate temperature, such as 400° F., see Fig. 6.

In this case the bimetallic bar is designed to have an initial free curvature OC substantially the same as has the bimetallic bar of Fig. 5, but instead of operating at the minimum temperature of 300° F. the bar 6 is designed to operate at say 400° F. which is substantially midway of the minimum and maximum temperatures of the preselected temperature range.

In order to obtain the maximum temperature setting in the case shown in Fig. 6, the bimetallic bar is moved from the position OC to the position OD by means of the adjusting screw applying a force at the point P. This adjustment produces a deflection of $$\frac{d}{2}$$

at the point P resulting in only one-half of the stress on the upper side of the thermostatic metal, as is set up in the bar of Fig. 5 when it is adjusted to its maximum temperature position.

In order to obtain the minimum temperature setting in our device the adjusting screw is moved outwardly from the sole plate allowing the compression spring 25 to move the bimetallic bar to the position OE, the spring applying a pressure to the bar in the upward direction at the point P. This produces a deflection of the bar at the point P also equal to $$\frac{d}{2}$$

This, it will be observed, produces a stress on the reverse side, i. e. the under side, of the bimetallic bar having a magnitude proportional to the deflection $$\frac{d}{2}$$

which, as before, is equal to one-half of the maximum stress set up in adjusting the bar of Fig. 5 from its minimum to its maximum temperature setting.

Thus, with the temperature control device arranged in accordance with our invention, the maximum stress set up in the bimetallic bar in adjusting it from its initial position to its minimum or maximum temperature setting, is only one-half the maximum stress set up in adjusting the bimetallic bar of Fig. 5 from its initial to its maximum temperature setting.

Obviously, the stress set up in adjusting our thermostat to any intermediate temperature setting is correspondingly less than is the stress set up in the bar of Fig. 5 in being moved to the same temperature setting.

The range between the maximum and minimum temperatures at which the circuit is opened and closed for any temperature setting of the control device is adjusted by means of the fixed bearing member 20. To increase this range the fixed bearing 20 is moved inwardly toward the spring member 18 so as to increase its tension, whereas to decrease this range the bearing 20 is moved outwardly to decrease the tension in the spring member.

Although any suitable heating unit may be used in the iron, we prefer to use a heating unit of the type described and claimed in Patent No. 1,367,341, granted to C. C. Abbott, and dated February 1, 1921. This unit comprises an outer metallic sheath 50 suitably shaped and in which a helical heating resistor 51 is embedded in a suitable powdered heat refractory insulating material 52, such as magnesium oxide. The heating unit is shaped roughly like a horse-shoe.

While we have shown a particular embodiment of our invention, it will be understood, of course, that I do not wish to be limited thereto since many modifications may be made, and we, therefore, contemplate by the appended claims to cover any such modifications as fall within the true spirit and scope of our invention.

What we claim as new and desire to secure by Letters Patent of the United States, is:

1. A temperature control device comprising a thermostatic member arranged so that its position is changed in a predetermined plane in response to changes in temperature, said member arranged to operate through a predetermined temperature range, the temperature of operation depending upon the curvature of said member, and said member when uninfluenced by external forces and when at substantially room temperature having an initial free curvature in said plane of movement such that with said curvature it will operate when heated at a temperature intermediate the maximum and minimum temperatures of said range, means for applying a force to one side of said thermostatic member to change the initial curvature thereof in said plane of movement so as to vary the temperature setting of said device and means for applying a force to the opposite side of said thermostat member to change its curvature in the opposite direction in said plane of movement to vary the temperature setting of said device in the reverse order.

2. A temperature control device comprising a bimetallic thermostat bar having one end fixed and its other end free to move in a predetermined plane in response to changes in temperature, said bar when uninfluenced by external forces and when at substantially room temperature having an initial free curvature from which it will operate when heated at a predetermined temperature, an elastic member bearing on the movable end of said bar so as to cause it to move quickly from one position to another in said plane, means for applying a force on one side of said bar to move it in one direction in said plane of movement so as to increase the curvature of said bar to increase the temperature at which said bar operates and spring means applying a force to the opposite side of said bar so as to decrease its curvature in said plane of movement to decrease the temperature at which said bar operates when said first force applying means is operated to release said bar.

3. A temperature control device comprising a thermostat bar movable in a predetermined plane, an elastic member acting on said bar so as to tend to move said bar from a neutral position in one or the other of two directions in said plane depending upon the position of said bar with respect to said neutral position, said bar when uninfluenced by said elastic member and when substantially at room temperature having an initial free curvature so that it assumes a position on one side of said neutral position when uninfluenced by said elastic member and from which it operates when heated at a temperature intermediate the maximum and minimum temperatures of a predetermimend temperature range, an adjusting member bearing on one side of said bar arranged to move said bar in said plane of movement to increase the curvature of said bar away from said neutral position and thereby increase the temperature at which said bar operates and a spring bearing on the other side of said bar arranged to move said bar in said plane of movement toward said neutral position to decrease the curvature of said bar and thereby decrease the temperature at which said bar operates, said spring having sufficient tension to cause said bar to assume a predetermined position when said adjusting member releases said bar from which position said bar will operate at substantially the minimum temperature of said temperature range.

4. A temperature control device for an electric flatiron provided with an electric heating circuit, comprising a bimetallic thermostat bar having one end movable in a predetermined plane in response to changes in temperature of said iron, a U-shaped spring member having one arm bearing on a pivot and its other arm bearing on the movable end of said bar, a contact member for controlling said heating circuit mounted on the middle portion of said U-shaped spring member so as to be actuated thereby, said bimetallic bar when uninfluenced by said spring member and substantially at room temperature having an initial free curvature from which curvature it operates when heated in said plane of movement to open said switch at a predetermined temperature, an adjustable member bearing on one side of said bar and arranged to apply a force to said bar to move the bar in one direction in said plane of movement to increase the curvature of said bar, whereby the setting of said bar is changed to maintain a higher temperature in said iron, and a coiled compression spring bearing on the opposite side of said bar and applying a force to said bar to move said bar in the opposite direction in said plane of movement against said adjusting member so as to decrease its curvature, whereby its setting is changed to maintain a lower temperature in said iron, the position of said bar being determined by the position of said adjustable member.

5. A temperature control device comprising a fixed support, a thermostat bar rigidly secured at one end to said support and having its other end free to move laterally in a predetermined plane of movement in response to changes in temperature, an elastic member bearing on said free end so as to cause said bar to move quickly from one position to another, said thermostat when uninfluenced by said elastic member and when at substantially room temperature having an initial free curvature in said plane of movement such that with said curvature it will operate when heated at a temperature intermediate the maximum and minimum temperatures of a predetermined temperature range, a shaft passing through an aperture provided for it in said thermostat bar screw threaded into said support and having an abutment on the upper side of said bar so that the curvature of said bar can be increased toward said support by turning said bar inwardly of said support and thereby increase the temperature setting of said thermostat and a coiled spring on said support beneath said bar surrounding said shaft and arranged to apply a force to the under side of said bar to decrease its curvature upwardly away from said support and thereby decrease the temperature setting of said thermostat.

CHARLES P. RANDOLPH.
SAMUEL ESKIN.